L. GEISER.
PEDAL LOCKING MECHANISM.
APPLICATION FILED MAY 19, 1919.
1,312,247.
Patented Aug. 5, 1919.
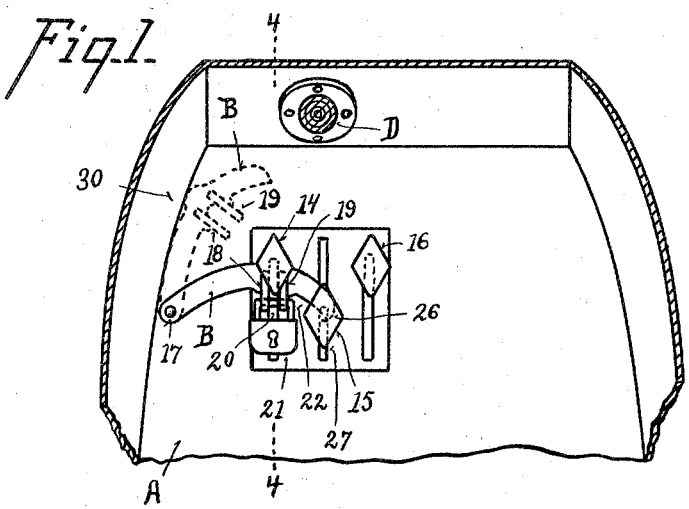
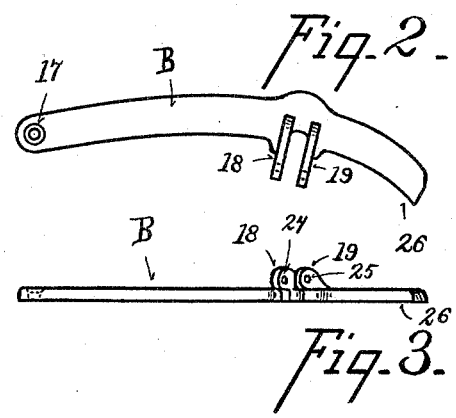
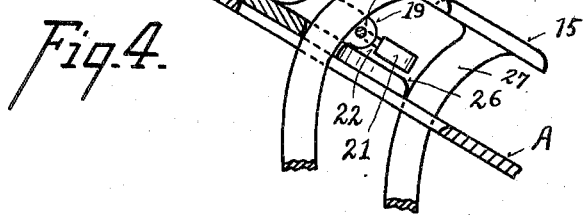
Inventor
Leonard Geiser,
By C. W. Miles,
Attorney

UNITED STATES PATENT OFFICE.

LEONARD GEISER, OF CINCINNATI, OHIO.

PEDAL-LOCKING MECHANISM.

1,312,247.　　　　　Specification of Letters Patent.　　Patented Aug. 5, 1919.

Application filed May 19, 1919. Serial No. 298,259.

*To all whom it may concern:*

Be it known that I, LEONARD GEISER, a citizen of the United States, residing at Cincinnati, in the county of Hamilton and State of Ohio, have invented certain new and useful Improvements in Pedal-Locking Mechanism, of which the following is a specification.

My invention relates to improvements in pedal locking mechanism. One of its objects is to provide improved simple efficient and reliable locking means. Another object is to provide locking means which will not be in the way and objectionable in its idle position. Another object is to provide pedal locking means adapted to be readily and conveniently installed for use. My invention also comprises certain details of form, combination, and arrangement, all of which will be fully set forth in the description of the accompanying drawings, in which:

Figure 1 is a diagram of the floor and pedals of an automobile, illustrating the application of my improved locking means.

Fig. 2 is a plan of my improved locking means detached.

Fig. 3 is a side elevation of the same.

Fig. 4 is a sectional diagram on line 4—4 of Fig. 1 illustrating the manner of locking the pedals.

The accompanying drawings illustrate the preferred embodiment of my invention in which A represents the floor of an automobile above which project two or more pedals, as for instance a clutch pedal 14, a reverse pedal 15 and a brake pedal 16. In order to effectually lock the pedals so as to prevent the machine being operated or taken away, it is desirable to lock both the clutch pedal 14 and the reverse pedal 15 against movement so as to perform their intended function. In order to accomplish this purpose with the advantages above mentioned, I provide a lever B of curved outline, which is pivotally connected to the floor of the machine by means of a bolt 17, or its equivalent. The lever B has one face resting upon the floor or close to the floor and is movable upon the center 17 from its idle position shown in dotted lines in Fig. 1, to its operative position shown in full lines in Fig. 1. Projecting from the upper face of the lever B are two projections 18 and 19 spaced apart sufficiently for the shank 20 of the clutch lever to enter between said projections after which the hasp 22 of an ordinary padlock 21 is inserted through the perforations 24 and 25 in the projections 18 and 19 to lock the shank 20 to the lever B. The outer end or free end 26 of lever B when said lever is locked to the shank 20 of pedal 14, occupies such relation to the shank 27 of pedal 15 as to prevent movement or operation of said pedal 15. The stem of the steering rod is represented by D.

The lever B is of comparatively light weight, being preferably a steel casting, and can be readily and conveniently attached in operative position without particular skill. It will be noted that when locked to the shank 20, any force exerted to operate the pedal 14 while the lever B is locked thereto will have a tendency to twist the shank 20 or lever B as distinguished from a direct resistance by thrust to the movement of the pedal, and hence a persistent effort to operate the pedal would result in putting the pedal out of condition to be operated at all before the lever B would be broken or forced to yield. When in its idle position the lever B rests upon the floor A close to the fender wall 30, in a position to be entirely out of the way of the operator of the car.

The article herein illustrated and described is capable of considerable modification without departing from the principle of my invention.

What I claim is:

A pedal lock comprising a curved lever pivotally connected at one end to the floor of a car at one side of the pedals to be locked, said lever having an idle position along the side margin of the floor and an active position transversely to its idle position in engagement with the pedals, and being provided with projections intermediate of its length and spaced apart to embrace the shank of one of the pedals to be locked with the free end of the lever in position to prevent movement of another pedal, and a locking member to engage and lock said projections to the shank of said pedal.

In testimony whereof I have affixed my signature.

LEONARD GEISER.

Copies of this patent may be obtained for five cents each, by addressing the "Commissioner of Patents, Washington, D. C."